July 24, 1962
H. E. LA ROCK, SR
3,045,985
LIQUID BLENDING AND MIXING APPARATUS SYSTEMS
Filed Dec. 17, 1959
3 Sheets-Sheet 1
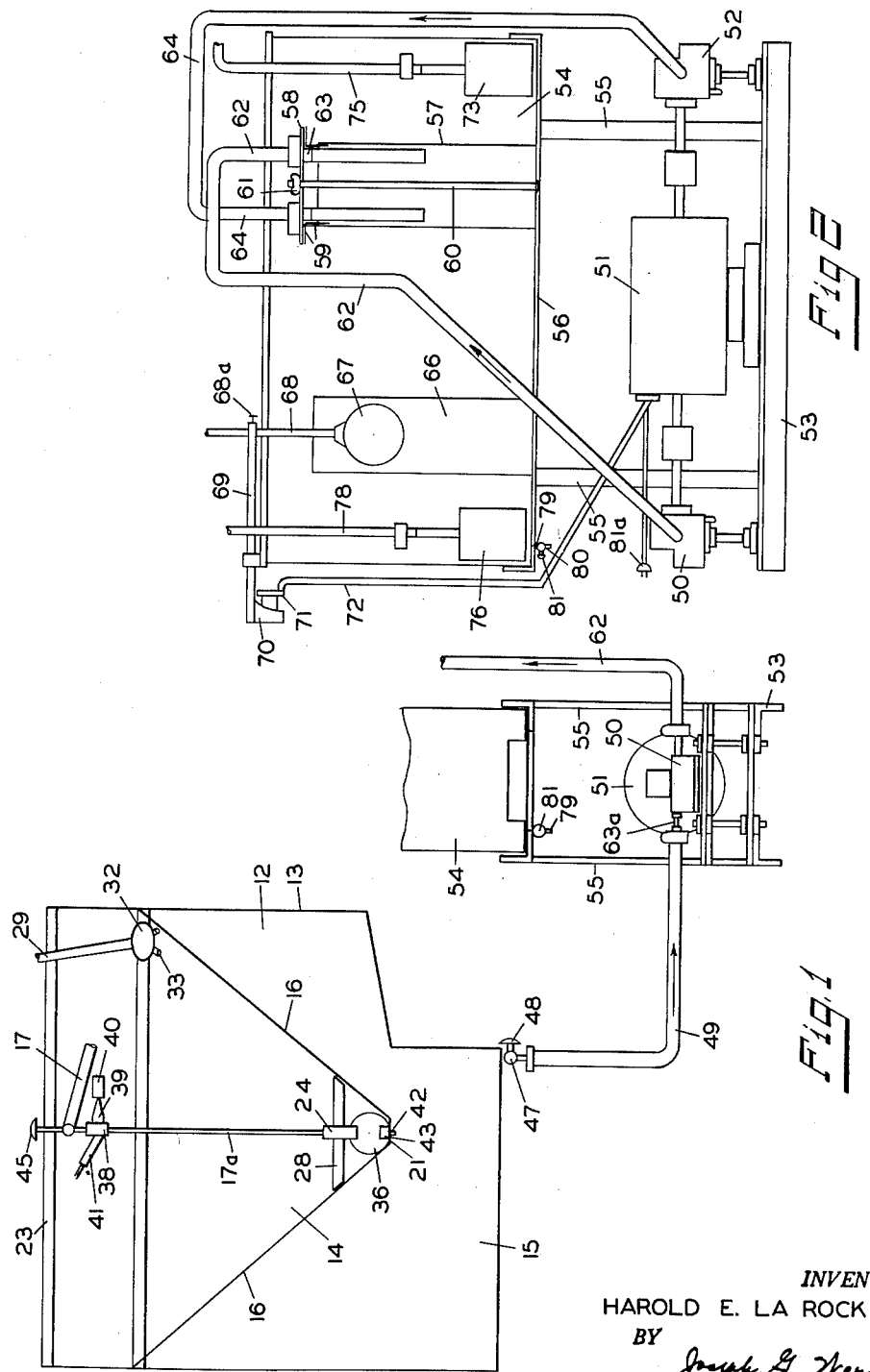
INVENTOR.
HAROLD E. LA ROCK SR.
BY
Joseph G. Werner
ATTORNEY July 24, 1962 H. E. LA ROCK, SR 3,045,985
LIQUID BLENDING AND MIXING APPARATUS SYSTEMS
Filed Dec. 17, 1959 3 Sheets-Sheet 2

INVENTOR.
HAROLD E. LA ROCK SR.
BY
Joseph G. Werner
ATTORNEY

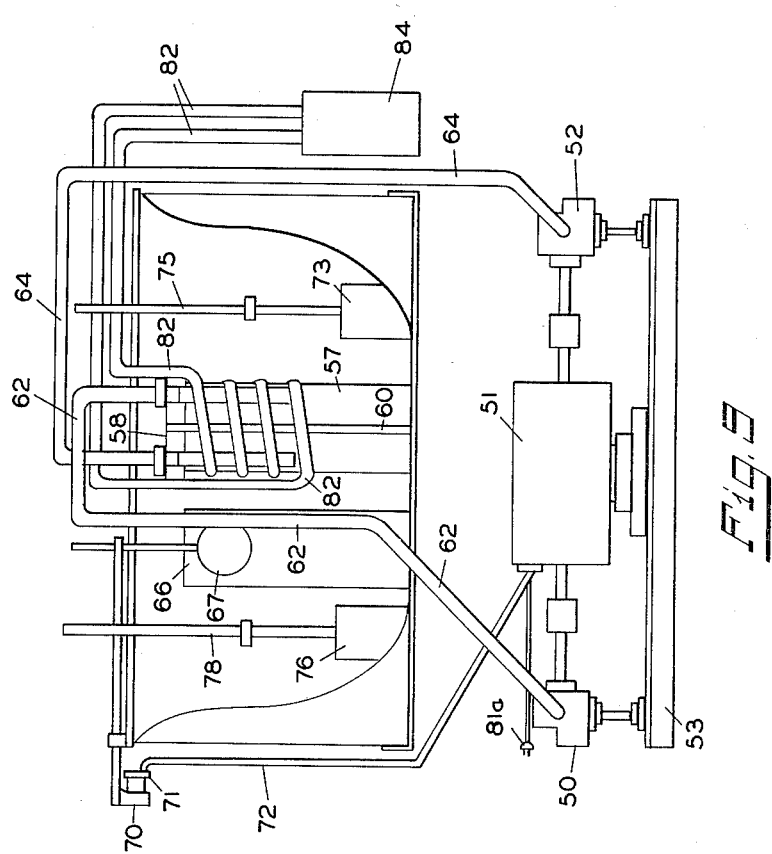
INVENTOR.
HAROLD E. LA ROCK SR.

United States Patent Office 3,045,985
Patented July 24, 1962

3,045,985
LIQUID BLENDING AND MIXING
APPARATUS SYSTEMS
Harold E. La Rock, Sr., 512 Menomonie St.,
Eau Claire, Wis.
Filed Dec. 17, 1959, Ser. No. 860,267
12 Claims. (Cl. 259—4)

This invention relates to liquid blending and mixing apparatus, and systems, and particularly relates to such apparatus and systems for blending and mixing of root beer and other beverages.

One of the problems in the operation of soft drink stands and plants has been the production of a product which contains a uniform amount of flavoring or flavor concentrate and mix, such as water. The final product may be carbonated or uncarbonated, as preferred. It is common practice at some soft drink establishments to place or squirt a random amount of the concentrated flavoring in a glass, then fill the glass with carbonated or other water and stir the mixture. Obviously, there is a complete lack of uniformity in the amount of flavoring in each drink that is so prepared. As hereafter shown, such lack of uniformity is aggravated if the flavoring or concentrate has not been fully mixed and blended.

In other instances, particularly at root beer stands, the root beer concentrate and the water is premixed and it is merely carbonated with a carbonater at the time the drink is served to the customer. In such treatment, it has also been difficult to obtain uniformity in the percentage of concentrate in the water, depending upon the extent of stirring and variations resulting from different persons doing the mixing and stirring. The proper proportioning of concentrate to water and the manner and amount of stirring by manual methods requires considerable skill. Unless the supply is carefully watched, there is a likelihood under former methods of exhausting the supply of mixed concentrate and water. In such case, the customers leave the counter or must wait until more of the concentrate and water have been mixed.

Another matter which requires attention in proper preparation of root beer and other beverages is the complete mixing and blending of the ingredients of the concentrate itself prior to its dilution with water. Such careful mixing of the concentrate ingredients produces still greater uniformity in the drink served to the customer.

It is the object of my invention to overcome the difficulties hereinabove mentioned and to produce beverages which are uniform in quality and taste by reason of proper proportioning of concentrate and water or other mix material.

An additional object of my invention is to eliminate the tedious work of manual blending of the ingredients in the base concentrate and also to eliminate manual mixing of the base concentrate and water.

A further object of my invention is to provide signal and automatic means for blending the ingredients of the concentrate, and for the mixing of concentrate and mix material, to avoid exhaustion of the supply thereof.

A still further object of my invention is to provide liquid blending and mixing apparatus which can be operated by persons who are unskilled in mixing procedures.

Still another object of my invention is to produce apparatus which will produce more satisfactory carbonation in a carbonated beverage.

Other objects and advantages will be apparent from the following description and drawings.

In the drawings:

FIG. 1 is an end elevational view of the concentrate blending unit with the end plate removed and an end elevational view of a portion of the mixing unit.

FIG. 2 is a front elevational view of the mixing unit with the front plate removed.

FIG. 8 is a side view of the float outlet for the concentrate blending unit.

FIG. 9 is a modification of the mixing unit shown in FIG. 2 with the front plate broken away.

Figure 4:
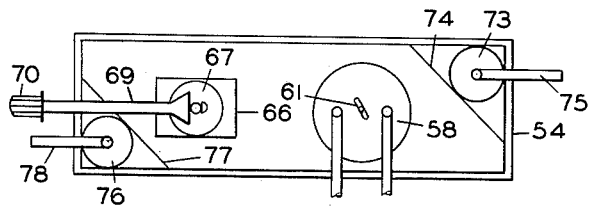
FIG. 4 is a top plan view of the mixing unit.
Figure 3:
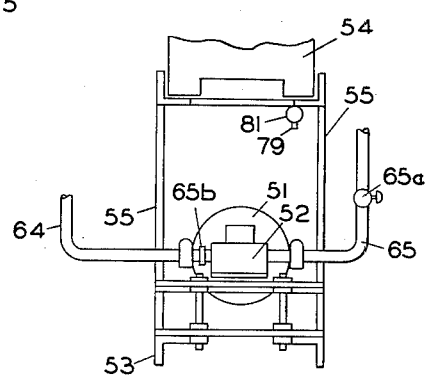
FIG. 3 is an elevational view of the other end of a portion of the mixing unit.
Figure 6:
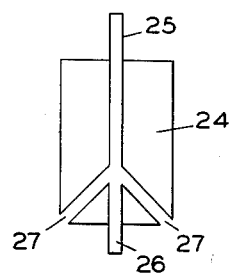
FIG. 6 is a cross-sectional enlarged view of the mixing nozzle for the concentrate blending unit.
Figure 7:
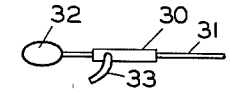
FIG. 7 is a top view of the float outlet for the concentrate blending unit.
Figure 5:
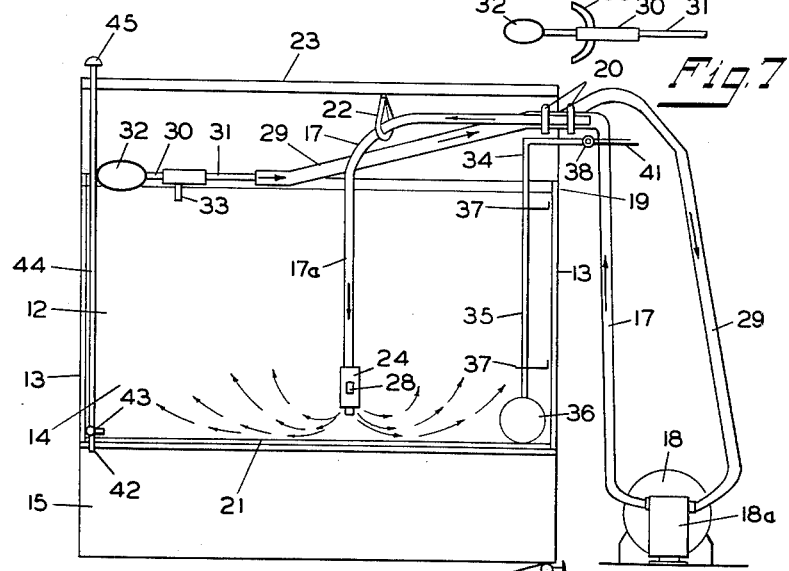
FIG. 5 is a side cross-sectional view of the concentrate blending unit.

Referring more particularly to the drawings, wherein like numerals refer to like parts, the concentrate blending unit 12 has a housing 13 with a blending chamber 14 and a holding tank 15. Blending chamber 14 is preferably V-shaped with sloping sides 16 removable from the housing 13 to permit cleaning of holding tank 15.

Inlet tubing 17 extends from gear pump 18a through wall 19 of housing 13 into blending chamber 14 and is retained in position by grommets 20. Gear pump 18a is operated by motor 18. Inlet tubing 17 is curved downward within housing 13 toward the bottom 21 of blending chamber 14 and may be positioned by a removable loop 22 suspended from cover 23. Inlet tubing 17 carries mixing nozzle 24 at the end which extends into the blending chamber 14. Mixing nozzle 24 has a hollow shaft 25 for connection to inlet tubing 17, a centrally disposed outlet orifice 26 and orifices 27 angularly disposed from the axis of open shaft 25. Mixing nozzle 24 carries placement bars 28 which may be secured to sides 16 in order substantially to center mixing nozzle 24 in relation to the sloping sides 16 of blending chamber 14.

Flexible outlet tubing 29 also extends from pump 18 through wall 19 of housing 13 to blending chamber 14 and is retained in position with respect to wall 19 by grommets or other means. Outlet tubing 29 carries float outlet 30 at its upper end. Float outlet 30 is comprised of an open stem 31 and a float 32. Outwardly and downwardly extending open tubes 33 are in communication with open stem 31.

Rod 34 extends through wall 19, from which is suspended float arm 35 carrying float ball 36 in blending chamber 14. Float arm 35 is retained in position by float arm guides 37. Rod 34 is connected to mercury switch 38 having switch trip-holder 39 and pivot pin 40, and connected to wires 41. When contact is made in the switch 38 a signal light or bell (not shown) is actuated.

Blending chamber 14 has a discharge opening 42 in bottom 21 which opening is controlled by valve 43 and has upward extending valve rod 44 with handle 45. Holding tank 15 has an opening at 46 which is controlled by valve 47 having handle 48.

Connecting tubing 49 extends from valve 47 to gear pump 50. Gear pump 50 is operatively connected to motor 51, which is also operatively connected to gear pump 52, said motor and gear pumps being supported by base 53. Base 53 also supports tank 54 with support braces 55 and support 56.

Tank 54 contains a mixing chamber 57 secured to the bottom of tank 54 having a splash plate 58 and spaced splash plate holders 59 extending between the mixing chamber 57 and the splash plate 58. The splash plate 58 is held in position by threaded bolt 60 carrying wingnut 61 for easy removal of the splash plate for cleaning. Concentrate hose or tubing 62 extends from gear pump 50 into mixing chamber 57 through splash plate 58. I have found that tubing 62 may preferably have an inside diameter of about ½ inch. In order to build up the required pressure for uniform mixture, there should be an insert disk or reducing valve 63a having an orifice of approximately 7/64 inch inside diameter near the junction of the tubing 49 with the gear pump 50 at the intake side of gear pump 50 as shown in FIG. 1. Another insert disk 63 of about 7/64 inch inside diameter is required in tubing 62 preferably near the top of mixing chamber 57. The specific location of such reduced insert discs may be modified somewhat provided that one insert disk 63a is located at the intake side of pump 50 and the other insert disk 63 is located at the outlet side of pump 50. The size of such tubing and the reduction discs may be varied somewhat, depending upon the amount of pressure desired, though the relative size of the tubing and the insert disks should be maintained. Water tubing 64 extends from gear pump 52 into mixing chamber 57 through splash plate 58. Water is supplied to gear pump 52 from water supply pipe 65, which has supply valve 65a. In order to maintain constant water pressure of the water flowing into mixing chamber 57, I place a relief valve 65b in the passage between pump 52 and the outlet of water tubing 64 in mixing chamber 57.

Tank 54 also contains float leveling chamber 66 having perforated walls. Float ball 67 is contained within leveling chamber 66 with float rod 68. Float rod 68 is adjustably secured by screw 68a to balancing bar 69 which is connected to switch holder 70 which in turn is connected to mercury switch 71. Wires 72 extends from mercury switch to motor 51.

A strainer 73, preferably of stainless steel, is seated in tank 54 and is held in place by strap 74. Tubing 75 leads from the strainer 73 to the carbonator (not shown) for distribution of the beverage to the customer. The tank 54 may also have another strainer 76, held in place by strap 77, with tubing 78 extending to the carbonator. Tank 54 has an outlet 79 with a valve 80 having handle 81.

While the size of the motors and tubing may be varied to suit particular needs, I have had satisfactory operation with a ¼ or ⅓ horsepower motor 18 and ⅝ inch plastic hose or tubing 17 and 29 for the concentrate blending unit. The portion 17a of tubing 17 extending from the top of blending chamber 14 to mixing nozzle 24 may be reduced to ⅜ inch stainless tubing.

I have found that a ½ horsepower motor 51 with about 1750 r.p.m. and a double shaft to be satisfactory for the mixing unit. When orifices 26 and 27 are 7/64 inch in diameter, they perform satisfactorily in the blending operation. Motor 51 is connected to electric current by electric plug 81a.

FIG. 9 shows a modification of the mixing unit wherein refrigeration tubing 82 attached to conventional compression refrigeration unit 84 is coiled about mixing chamber 57 to promptly cool the water and concentrate as it is mixed in the mixing chamber 57.

In operation root beer concentrate (or a base concentrate consisting of water and sugar for subsequent mixture with flavor concentrates) is deposited in blending chamber 14 when valve 43 is closed. Motor 18 is actuated so as to operate gear pump 18a which draws the concentrate through tubes 33 and outlet tubing 29 to the gear pump 18a where it is forced through inlet tubing 17 and 17a into mixing nozzle 24. The concentrate passes through orifices 26 and 27 at a relatively high pressure. By forcing the concentrate into blending chamber 14 in different directions through mixing nozzle 24 and continuing the circulation of the concentrate through outlet tubing 29 and inlet tubing 17, as long as deemed necessary, the concentrate becomes thoroughly mixed and blended. When the concentrate has been so blended, valve 43 is opened and left open to permit the blended concentrate to flow into holding tank 15.

Valve 47 is open to permit the flow of the blended concentrate from holding tank 15 through connecting tubing 49 to gear pump 50. Motor 51 is activated causing gear pumps 50 and 52 to operate simultaneously. Pump 50 forces the concentrate received from tubing 49 at relatively high pressure, because of the reducing disks 63a and 63 into mixing chamber 57. At the same time, pump 52 forces water from water supply pipe 65 through tubing 64 into mixing chamber 57. The relatively high pressure with which the concentrate enters mixing chamber 57 causes it to mix well and uniformly with the water. As stated, uniform pressure is maintained in tubing 64 by relief valve 65b. The mixture overflows over the top of the mixing chamber 57 between spaced splash plate holders 59. The flow of the mixed concentrate and water upward in the mixing chamber against splash plate and into tank 54 assist in the complete mixing of the concentrate and water. As the mixed concentrate and water is needed for serving to customers, it is drawn out through tube 75 (and tube 78 in a dual operation) to the carbonator, where it is carbonated and served through a faucet to the customer's glass. I have found that a mixture of 5 parts water to one part root beer concentrate provides a very pleasing flavor. The proportions may, of course, be changed as desired by regulating the respective flow through pumps 50 and 52.

When the level of the mixture reaches a predetermined level in tank 54, float ball 67 as connected to balancing bar will cause mercury switch 71 to stop motor 51.

As the mixed concentrate and water in tank 54 is used, float ball 67 is lowered. When the float ball 67 reaches a predetermined level in relation to balancing bar 69, mercury switch 71 will cause motor 51 to start; thereby automatically maintaining a constant supply of the mixture in tank 54.

Likewise, as the blended concentrate in blending unit 12 is transferred to mixing unit tank 54 the float ball 36 is lowered. When the blending chamber 14 is emptied the float ball 36 by its connection with float arm 35, rod 34 and mercury switch 38 provides a red light or other signal to warn the operator that the blending chamber 14 is empty. The operator then closes valve 43 and proceeds to blend more concentrate. The holding tank 15 holds a sufficient quantity, such as five gallons, so that the mixing operation in mixing tank 54 may continue and customers served, while additional concentrate is being blended in blending chamber 14.

When the mixed product is cooled by refrigeration as shown in FIG. 9, a better product is served to the customer. Such refrigeration produces better carbonation as there is a greater absorption of carbon dioxide. The product is not as "wild" and foamy when so refrigerated.

Thus, it is seen that my system provides for an automatic and uniform method of blending the initial concentrate. It further provides apparatus and a method for automatic and uniform mixing of concentrate and water which a novice can perform as readily and as satisfactorily as an expert. The resulting product is uniform in the proportions of concentrate and water and the taste is enhanced by such uniform and complete blending and mixing. Furthermore, the expenditure of labor previously required for blending and mixing is practically eliminated.

While the foregoing description has generally referred to the blending of root beer concentrate and the mixing of such concentrate with water, it is to be understood that the apparatus and method may be used for other beverages and flavors. For example, the blending operation may be used for the blending of a base concentrate of sugar and water for subsequent use with various flavor concentrates. It is to be further understood that such blending and mixing apparatus and methods may be used with products other than beverages. The size of the tubings, valves and apertures may be varied, of course, depending upon the viscosity of the products and the desired results.

I claim:

1. In combination apparatus for blending materials in liquid form and for mixing such blended materials with other liquids comprising, a blending chamber for materials to be blended, outlet means extending into said materials and having pump means connected thereto to withdraw said materials from the blending chamber, inlet means to said pumping means to force said materials into the blending chamber, means secured to said inlet means for circulating said materials within the blending chamber, a holding tank, means connecting said holding tank to said blending chamber, a mixing tank, a mixing chamber within the mixing tank, means for forcing the material at high pressure from said holding tank into said mixing chamber, means for simultaneously forcing other liquid into said mixing chamber to mix said materials and other liquid, means secured to said mixing chamber for transferring such mixture into said mixing tank, means for removal of such mixture from said mixing tank, and means in communication with said mixture for maintaining said mixture above a pre-determined level within said mixing tank.

2. Liquid blending and mixing apparatus comprising, a blending chamber, a pump, inlet and outlet tubing connected to said pump and extending into said blending chamber, a mixing nozzle connected to said inlet tubing, a float controlled outlet connected to said outlet tubing, means extending within said blending chamber for indicating the liquid level therein, a holding tank connected to the blending chamber, a mixing tank, a mixing chamber within the mixing tank, pump means for forcing a liquid at high pressure from said holding tank into said mixing chamber, pump means for simultaneously forcing other liquid into said mixing chamber to mix said liquids, overflow means in communication with said mixing chamber to permit the transfer of said mixed liquids from said mixing chamber to said mixing tank, means for removal of the mixed liquids from said mixing tank, and means in communication with said mixture for maintaining said mixture above a pre-determined level within said mixing tank.

3. Apparatus for mixing a first liquid with a second liquid comprising, a tank, a mixing chamber within said tank, a supply source for said first liquid, a first pump, tubing connecting said first supply source with said first pump, tubing connecting said first pump and said mixing chamber whereby to force said first liquid at high pressure into said mixing chamber, a supply source for said second liquid, a second pump, tubing connecting said second liquid supply source and said second pump, tubing connecting said second pump and said mixing chamber whereby to force said second liquid into said mixing chamber simultaneously with said first liquid to mix said liquids, a spaced splash plate mounted on said mixing chamber, outlet means between said splash plate and said mixing chamber for the transfer of said mixed liquids from said mixing chamber to said tank, means for removal of the mixed liquids from said tank, and means in communication with said mixture for maintaining said mixture above a predetermined level within said mixing tank.

4. The apparatus of claim 3 additionally including a reducing valve in said tubing connecting said first supply source and said first pump and a reducing valve in said tubing connecting said first pump and said mixing chamber, whereby to produce the high pressure for the first liquid passing into the mixing chamber.

5. The apparatus of claim 4 additionally including a relief valve in the tubing connecting the second pump and said mixing chamber whereby to maintain constant pressure of said second liquid passing into the mixing chamber.

6. The apparatus of claim 3 wherein the splash plate is secured to spaced splash plate holders which are secured to said mixing chamber.

7. Apparatus for mixing a first liquid with a second liquid comprising, a tank, a mixing chamber within said tank, a supply source for said first liquid, pump means connected to said supply source in communication with said mixing chamber whereby to force said first liquid at high pressure into said mixing chamber, a supply source for said second liquid, pump means connecting said second liquid supply source in communication with said mixing chamber whereby to force said second liquid into said mixing chamber simultaneously with said first liquid to mix said liquids, a spaced splash plate mounted on said mixing chamber, outlet means connecting said mixing chamber and said splash plate for transfer of said mixed liquids from said mixing chamber to said tank, means for removal of the mixed liquids from said tank, and means in said tank for maintaining said mixture above a predetermined level within said mixing tank.

8. In combination apparatus for blending materials in liquid form and for mixing such blended materials with other liquids comprising, a blending chamber for materials to be blended, outlet means for said materials with pump means connected thereto to withdraw said materials from the blending chamber, inlet means connected to said pump means to force said materials into the blending chamber, means secured to said inlet means for circulating said materials within the blending chamber, a holding tank, a blending chamber, means for the passage of said materials between said tank and said blending chamber, a mixing tank, a mixing chamber within the mixing tank, means for forcing the material at high pressure from said holding tank into said mixing chamber, means for simultaneously forcing other liquid into said mixing chamber to mix said materials and other liquid, means secured to said mixing chamber for transferring such mixture into said mixing tank and means for removal of such mixture from said mixing tank.

9. In combination apparatus for blending materials in liquid form and for mixing such blended materials with other liquids comprising, a blending chamber for materials to be blended, outlet means for said materials with pump means connected thereto to withdraw said materials from the blending chamber, inlet means connected to said pump means to force said materials into the blending chamber, means secured to said inlet means for circulating said materials within the blending chamber, a holding tank, a blending chamber, means for the passage of said materials between said tank and said blending chamber, a mixing tank, a mixing chamber within the mixing tank, means for forcing the material at high pressure from said holding tank into said mixing chamber, means for simultaneously forcing other liquid into said mixing chamber to mix said materials and other liquid, refrigeration means in communication with said mixing chamber to cool the mixture, means secured to said mixing chamber for transferirng such mixture into said mixing tank and means for removal of such mixture from said mixing tank.

10. Apparatus for mixing a first liquid with a second liquid comprising, a tank, a mixing chamber within said tank, a supply source for said first liquid, a first pump, tubing connecting said first supply source and said first pump with a first reducing valve therein and tubing connecting said first pump and said mixing chamber with a second reducing valve therein whereby to force said first liquid at high pressure into said chamber, a supply source for said second liquid, a second pump, tubing connecting said second liquid supply source and said second pump, tubing connecting said second pump and said mixing chamber whereby to force said second liquid into said mixing chamber simultaneously with said first liquid to mix said liquids, outlet means in said mixing chamber for transfer of said mixed liquids from said mixing chamber to said tank, and means for removal of the mixed liquids from said tank.

11. The apparatus of claim 10 wherein the said reducing valves have orifices of substantially the same size.

12. The apparatus of claim 10 additionally including a relief valve in the tubing connecting the second pump and said mixing chamber whereby to maintain constant pressure of the second liquid passing into the mixing chamber.

References Cited in the file of this patent

UNITED STATES PATENTS

| | | |
|---|---|---|
| 2,134,104 | Cressy | Oct. 25, 1938 |
| 2,142,062 | Thurman | Dec. 27, 1938 |
| 2,452,142 | Pecker | Oct. 26, 1948 |
| 2,521,334 | Boerstra | Sept. 5, 1950 |
| 2,597,422 | Wood | May 20, 1952 |
| 2,702,786 | Hakes | Feb. 22, 1955 |
| 2,709,679 | Andrus | May 31, 1955 |
| 2,724,581 | Pahl et al. | Nov. 22, 1955 |
| 2,852,237 | Rees | Sept. 16, 1958 |
| 2,900,176 | Krogel | Aug. 18, 1959 |
| 2,915,023 | Papaport | Dec. 1, 1959 |

FOREIGN PATENTS

| | | |
|---|---|---|
| 1,179,364 | France | Dec. 22, 1958 |

UNITED STATES PATENT OFFICE

CERTIFICATE OF CORRECTION

Patent No. 3,045,985

July 24, 1962

Harold E. La Rock, Sr.

It is hereby certified that error appears in the above numbered patent requiring correction and that the said Letters Patent should read as corrected below.

In the drawings, Sheets 1 to 3, line 2, and in the heading to the printed specification, lines 2 and 3, for "LIQUID BLENDING AND MIXING APPARATUS SYSTEMS", each occurrence, read -- LIQUID BLENDING AND MIXING APPARATUS AND SYSTEMS --; column 5, line 6, after "means", first occurrence, insert -- connected --.

Signed and sealed this 25th day of December 1962.

(SEAL)
Attest:

ERNEST W. SWIDER
Attesting Officer

DAVID L. LADD
Commissioner of Patents